United States Patent
Morgan et al.

(10) Patent No.: US 8,718,937 B2
(45) Date of Patent: May 6, 2014

(54) METHODS AND APPARATUS FOR REAL TIME POSITION SURVEYING USING INERTIAL NAVIGATION

(75) Inventors: Kenneth S. Morgan, St. Petersburg, FL (US); Jeffrey A. VanGuilder, Largo, FL (US); John S. White, Clearwater, FL (US)

(73) Assignee: Honeywell International Inc., Morristown, NJ (US)

( * ) Notice: Subject to any disclaimer, the term of this patent is extended or adjusted under 35 U.S.C. 154(b) by 2227 days.

(21) Appl. No.: 11/237,259

(22) Filed: Sep. 28, 2005

(65) Prior Publication Data

US 2007/0073481 A1    Mar. 29, 2007

(51) Int. Cl.
*G01C 21/10* (2006.01)

(52) U.S. Cl.
USPC ........................... 701/500; 701/505

(58) Field of Classification Search
USPC ........................... 701/220, 500, 505
See application file for complete search history.

(56) References Cited

U.S. PATENT DOCUMENTS

| | | | |
|---|---|---|---|
| 4,060,718 A | 11/1977 | Huddle | |
| 4,168,524 A | 9/1979 | Soltz et al. | |
| 5,272,639 A | 12/1993 | McGuffin | |
| 5,331,562 A | 7/1994 | McGuffin | |
| 5,331,578 A * | 7/1994 | Stieler | 702/93 |
| 5,335,181 A | 8/1994 | McGuffin | |
| 5,617,317 A | 4/1997 | Ignagni | |
| 5,923,286 A | 7/1999 | Divakaruni | |
| 6,140,957 A | 10/2000 | Wilson et al. | |
| 6,202,535 B1 | 3/2001 | Alhadef et al. | |
| 6,480,148 B1 | 11/2002 | Wilson et al. | |
| 2002/0111717 A1 * | 8/2002 | Scherzinger et al. | 701/1 |

FOREIGN PATENT DOCUMENTS

| | | |
|---|---|---|
| EP | 1291617 A | 3/2003 |
| JP | 63311115 | 12/1988 |
| JP | 04-203932 | 7/1992 |
| JP | 04203931 | 7/1992 |
| JP | 05248882 | 9/1993 |
| JP | 06034379 | 2/1994 |
| WO | WO 2004 048893 A | 6/2004 |

OTHER PUBLICATIONS

Japan Patent Office, "Notification of Reasons for Rejection", Published in: JP.
European Patent Office, "Office Action", "from Foreign Counterpart of U.S. Appl. No. 11/237,259", Oct. 28, 2010, pp. 1-5, Published in: EP.
European Patent Office, "European Search Report", "from Foreign Counterpart of U.S. Appl. No. 11/237,259", Feb. 1, 2008, pp. 1-6, Published in: EP.

(Continued)

*Primary Examiner* — Imran Mustafa
(74) *Attorney, Agent, or Firm* — Fogg & Powers LLC

(57) ABSTRACT

A method for determining the relative position of two points using an inertial navigation system is described. The method comprises estimating position error states and a position solution with an INS at a first position, estimating position error states and a position solution with the INS at a second position, and returning the INS to the first position. Estimates of the first and second position error states are adjusted based on correlations developed during a transition returning the INS from the second position to the first position.

14 Claims, 2 Drawing Sheets

(56) References Cited

OTHER PUBLICATIONS

State of Israel Ministry of Justice, "Office Action", "from Foreign Counterpart of U.S. Appl. No. 11/237,259", Jan. 1, 2010, pp. 1-2, Published in: IL.

State of Israel Minister of Justice, "Office Action", "from Foreign Counterpart of U.S. Appl. No. 11/237,259", Jul. 17, 2011, pp. 1-4, Published in: IL.

State of Israel Minister of Justice, "Office Action", "from Foreign Counterpart of U.S. Appl. No. 11/237,259", Mar. 19, 2013, pp. 1-4, Published in: IL.

Korean Intellectual Property Office, "Office Action", "from Foreign Counterpart of U.S. Appl. No. 11/237,259", Jun. 3, 2013, pp. 1-5, Published in: KR.

Japanese Patent Office, "Office Action", "from Foreign Counterpart of U.S. Appl. No. 11/237,259", Jul. 4, 2011, pp. 1-6, Published in: JP.

Japanese Patent Office, "Office Action", "from Foreign Counterpart of U.S. Appl. No. 11/237,259", Apr. 13, 2012, pp. 1-4, Published in: JP.

Japanese Patent Office, "Notice of Allowance", "from Foreign Counterpart of U.S. Appl. No. 11/237,259", Jun. 21, 2012, pp. 1-4, Published in: JP.

Korean Intellectual Property Office, "Office Action", "from Foreign Counterpart of U.S. Appl. No. 11/237,259", Jan. 7, 2013, pp. 1-26, Published in: KR.

* cited by examiner

METHODS AND APPARATUS FOR REAL TIME POSITION SURVEYING USING INERTIAL NAVIGATION

BACKGROUND OF THE INVENTION

This invention relates generally to determining a position of a vehicle, and more specifically, to methods and apparatus for real time position surveying using Inertial Navigation Systems (INS).

Accuracy in the reported position of a vehicle is important with respect to a number of vehicle applications. For example, accurate position information is desired in gun placement and aiming applications where data relating to range, bearing and elevation between guns should be very accurate. Global Positioning Systems (GPS) are one known source of fairly accurate position information. However, not all systems that utilize such accurate position information are equipped with GPS capability.

BRIEF SUMMARY OF THE INVENTION

In one aspect, a method for determining the relative position of two or more points using an inertial navigation system is provided. The method comprises estimating position error states and a position solution with an INS at a first position, estimating position error states and a position solution with the INS at one or more subsequent positions, returning the INS to the first position, and adjusting estimates of the first and subsequent position error states based on correlations developed during a transition returning the INS from the second position to the first position.

In another aspect, a system for determining the relative position of two or more points is provided. The system comprises an inertial navigation system and a computer based system communicatively coupled to the INS. The INS is configured to estimate position error states and position solutions for at least two INS positions. The computer based system further comprises a filter programmed to adjust estimates of the position error states based on correlations developed during a transition where the INS returns to a first INS position, point A, from one or more subsequent INS positions.

In still another aspect, a data management system configured to receive inertial data from an inertial navigation system is provided. The data management system comprises at least one processor programmed to estimate position error states and position solutions for INS positions, and a filter programmed to adjust estimates of the position error states based on correlations developed during a transition of the INS from a subsequent INS position back to a first INS position.

DETAILED DESCRIPTION OF THE INVENTION

The methods and apparatus described herein provide for the relative position of two locations on the earth to be very accurately measured, using inertial navigation as a basis. Further, the position is accurately determined without utilizing external aiding sources such as the Global Positioning System (GPS).

Figure 1:
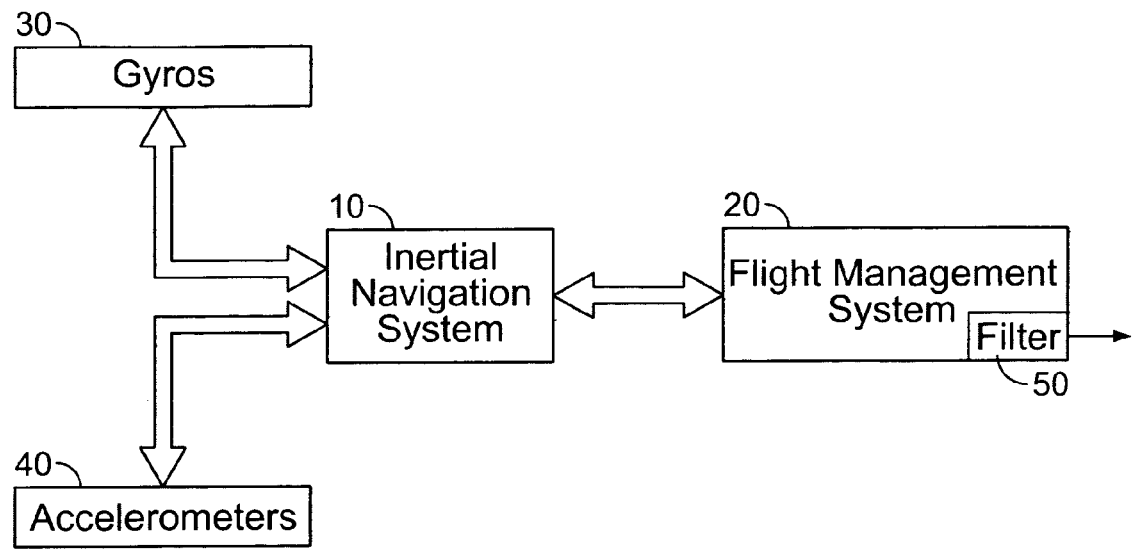
FIG. 1 is a block diagram of an inertial navigation system communicatively coupled to a computer based system.

FIG. 1 is a block diagram of an inertial navigation system (INS) 10 interfaced to a computer based system 20, for example, a data management system. Inertial data is provided to INS 10, at least in one embodiment, from one or more gyroscopes 30 and accelerometers 40. INS 10 formats the inertial data received from gyroscopes 30 and accelerometers 40 and transmits the formatted inertial data to computer based system 20.

Computer based system 20 includes a computer program that causes the computer therein to process data received from inertial navigation system (INS) 10. In one embodiment, an enhancement to the computer program allows the relative position of two points to be determined more accurately than a standalone INS 10 is capable of measuring. More specifically, a data smoothing technique is incorporated within the computer program which provides a position result without the need for lengthy offline data processing.

In a specific embodiment, the program run within computer based system 20 includes a recursive filter 50, for example a Kalman filter, that is configured to estimate and correct errors associated with the inertial data received from INS 10. The recursive filter 50 utilize zero position change updates as occasional observations of INS velocity error propagation. In the embodiment, the filter 50 is augmented to contain six extra states which represent the position error at two estimation points, and further incorporates the processing for utilization of these states.

Figure 2:
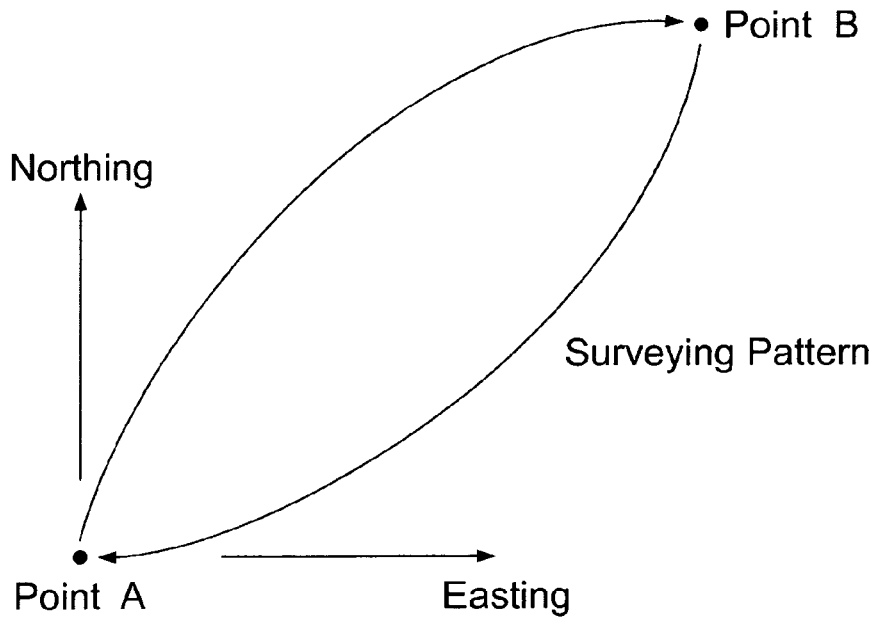
FIG. 2 is a sample pattern utilized for position surveying.

The two estimation points are sometimes referred to herein as points A and B, or as a first position and a second position, and includes the special processing required to utilize the six extra states. Points A and B and a sample surveying pattern therebetween are illustrated in FIG. 2. To populate the six extra states which represent the position error at two estimation points, INS 10 is transported to point A where it is held substantially stationary for a period of time, for example, approximately 30 seconds. Computer based system 20 is programmed to, via recursive filter 50, copy a current position error state into point A error states, which are a portion of the six extra states. Computer based system 20 further stores a current position solution for point A.

INS 10 is transported to point B and is held stationary for approximately the same period of time. Filter 50 is again updated to copy the current position error state into point B error states, and the current position solution is stored for point B. INS 10 is again transported back to point A and held stationary for a period of time. At this point, filter 50 is updated with differences between the current position solution and the previously stored point A position.

A filter observation matrix for this update of filter 50 is formed to observe the current position error states minus the point A error states. This update of filter 50 adjusts the estimates of the point A and B position errors based on the correlations developed in a filter covariance matrix during the transitions between points A and B. Final point A and B position estimates are formed by adding the point A and B estimated errors to the previously stored position values.

The following equations provide an example of a Kalman filter implementation, as described above, where INS 10 is working in a wander azimuth frame, and the survey is conducted in universal transverse mercator grid frame.

The Kalman filter embodiment of filter 50 within computer based system 20 processes inertial measurement data from INS 10 to produce real time estimates of position and velocity. More specifically, filter 50 maintains an error covariance matrix which contains information regarding the expected error in each state estimate and the correlations between the various error states associated, for example, with points A and B. This error covariance matrix is propagated in time as the inertial data is processed using the standard equation:

$P_{N+1} = \Phi P_N \Phi^T + Q$, where P is an error covariance matrix, $\Phi$ is a state transition matrix, and Q is a plant noise matrix.

When the vehicle is at point A the $\Phi$ matrix is adjusted for one filter cycle to copy the current error state into the additional point A error states. This modification takes the form of adding the following entries for a single filter cycle. Specifically, $\Phi(POS\_A\_E, PX) = -\sin(Wander\_to\_Grid)$
$\Phi(POS\_A\_E, PY) = -\cos(Wander\_to\_Grid)$
$\Phi(POS\_A\_N, PX) = -\cos(Wander\_to\_Grid)$
$\Phi(POS\_A\_N, PY) = \sin(Wander\_to\_Grid)$
$\Phi(POS\_A\_A, PZ) = 1.0$ where POS_A_E is a point A easting error state, POS_A_N is a point A northing error state, POS_A_A is a point A altitude error state, PX is a navigator wander frame X error state, PY is a navigator wander frame Y error state, PZ is a navigator wander frame Z error state, and Wander_to_Grid is a current azimuth angle between wander and grid frames. Processing point B current error states is very similar, with POS_B substituted for POS_A.

Upon returning to point A, computer based system 20 is configured to apply a measurement update to filter 50. The measurement includes the difference between the current navigation position and the position recorded at the first visit to point A. The differences result in the following observation matrix entries for the updating of point A position are shown below. Specifically, $H (OBS\_POS\_A\_E, PX) = \sin(Wander\_To\_Grid),$
$H (OBS\_POS\_A\_E, PY) = \cos(Wander\_To\_Grid),$
$H (OBS\_POS\_A\_N, PX) = \cos(Wander\_To\_Grid),$
$H (OBS\_POS\_A\_N, PY) = -\sin(Wander\_To\_Grid),$
$H (OBS\_POS\_A\_A, PZ) = -1.0,$
$H (OBS\_POS\_A\_E, POS\_A\_E) = 1.0,$
$H (OBS\_POS\_A\_N, POS\_A\_N) = 1.0,$ and
$H (OBS\_POS\_A\_A, POS\_A\_A) = 1.0,$ where OBS_POS_A_E is the observation of the difference in easting position, OBS_POS_A_N is the observation of the difference in northing position, and OBS_POS_A_A is the observation of the difference in vertical position.

Kalman gains for the position update are computed using the standard equation, $G = PH^T(HPH^T + R)^{-1}$, where R is the error covariance matrix for the measurement update and represents the error in exactly returning the vehicle to point A and so is a small number for each measurement axis. Therefore measurement errors can be considered uncorrelated.

Although the point B position error states are not explicitly observed, they are updated via the cross correlations developed by the propagation of the P matrix (using the equation above) during the transit back to point A. The final solution for the positions of points A and B are the positions recorded when first visited by the survey vehicle, minus the error estimates provided by the processing contained in the POS_A_ . . . and POS_B_ . . . states. More specifically, $$PosA = \begin{bmatrix} PA\_E - \hat{X}(POS\_A\_E) \\ PA\_N - \hat{X}(POS\_A\_N) \\ PA\_A - \hat{X}(POS\_A\_A) \end{bmatrix}$$

$$PosB = \begin{bmatrix} PA\_E - \hat{X}(POS\_B\_E) \\ PA\_N - \hat{X}(POS\_B\_N) \\ PA\_A - \hat{X}(POS\_B\_A) \end{bmatrix}$$

where PA_E, PA_N, PA_A are the easting, northing, and altitude navigator position coordinates recorded at the first visit to point A, PB_E, PB_N, PB_A are the easting, northing, and altitude navigator position coordinates recorded at the visit to point B, and $\hat{X}$ is a filter state vector.

Figure 3:
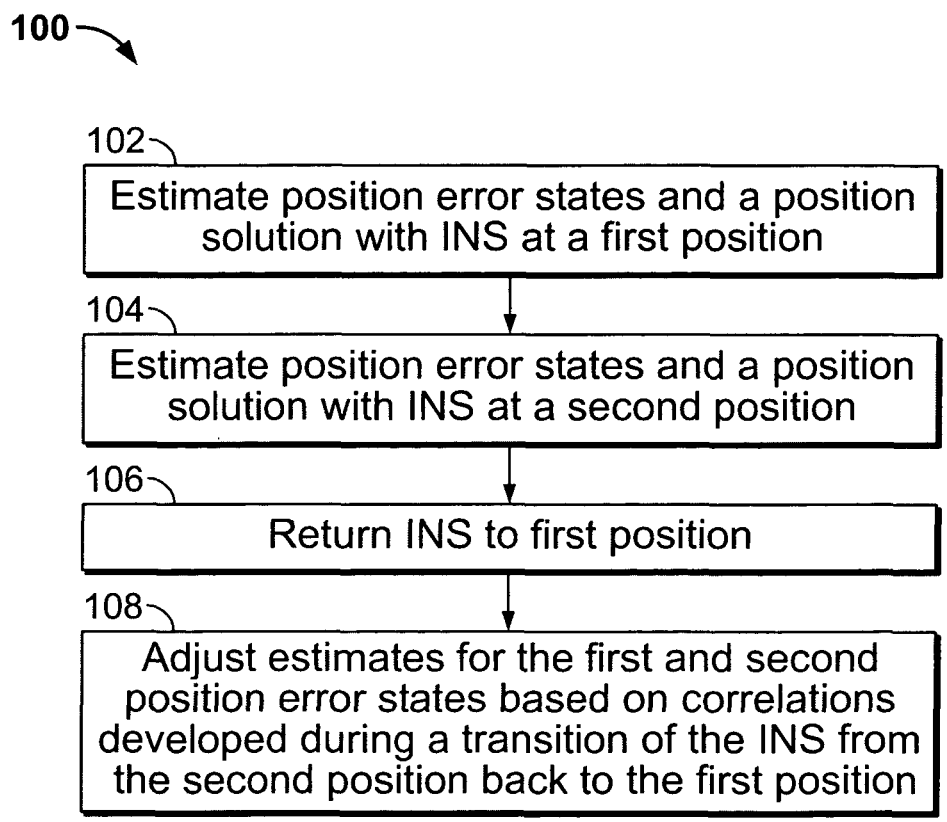
FIG. 3 is a flowchart of a position surveying method.

FIG. 3 is a flowchart 100 that generally illustrates the above described methods for determining the relative position of two points using inertial navigation system 10. The method includes estimating 102 position error states and a position solution with an INS at a first position, estimating 104 position error states and a position solution with the INS at a second position, and returning 106 the INS to the first position. Upon a return to the first position, sometimes referred to herein as point A, estimates of the first and second position error states are adjusted 108 based on correlations developed during a transition returning the INS from the second position to the first position.

While the above methods and systems are described with respect to an INS traveling from a point A to a point B, and back to point A again, alternative embodiments can be implemented which utilize, or involve movement of the INS to multiple intermediate data points, sometime referred to as subsequent positions, before returning to point A. In other alternative embodiments, point A may be a surveyed point, or one of the subsequent positions may be a surveyed point, for which the positions are known. In the embodiment involving a surveyed point A, the INS is moved from the surveyed point A to multiple interim points to another surveyed point or back to surveyed point A.

These alternative embodiments provide good estimates of the positions of the interim (non-surveyed) points. As will be understood by those skilled in the art, each subsequent position (e.g., each interim point) for which an INS position is determined involves configuring the recursive filter with error states for each interim point. Similar to the two position method (e.g., point A and point B) described above, as the INS (e.g., INS 10) is transported to each subsequent position and held stationary for a period of time, the recursive filter is updated to copy the current position error state into the respective position error states, and the current position solution for each subsequent position is stored.

As the INS is transported back to point A and held stationary for a period of time, the recursive filter is updated with differences between the current position solution and the previously stored point A position. Similar calculations are performed when the INS is moved to a surveyed point other than the beginning point A. In either embodiment, the filter observation matrix for the update of the recursive filter 50 is formed to observe the current position error states minus the starting point A error states in order to adjust the estimates of the interim point position errors based on the correlations developed in a filter covariance matrix during the transitions between the various interim points. Final position estimates are formed by adding the estimated errors for the interim points to previously stored position values. The recursive filter, which may be a Kalman filter, maintains the error covariance matrix which contains information regarding the expected error in each state estimate and the correlations between the various error states associated, for example, with points A and B and any interim points therebetween. This error covariance matrix is propagated in time as the inertial data is processed similarly to that described above.

While the invention has been described in terms of various specific embodiments, those skilled in the art will recognize that the invention can be practiced with modification within the spirit and scope of the claims.

What is claimed is:

1. A system for determining the relative position of two or more points comprising:
    an inertial navigation system (INS); and
    a computer based system communicatively coupled to said INS and configured to estimate position error states and position solutions for at least two INS positions, said computer based system comprising a filter programmed to adjust estimates of the position error states based on correlations developed during a transition where said INS returns to a first INS position, point A, from one or more subsequent INS positions, wherein the filter processes inertial measurement data from the INS to produce real time estimates of position and velocity.

2. A system according to claim 1 wherein said filter comprises a Kalman filter augmented to contain a plurality of extra error states to represent position errors at the at least two MS positions.

3. A system according to claim 2 wherein said filter comprises an error covariance matrix which contains information regarding an expected error in each state estimate and correlations between various error states associated with each INS position.

4. A system according to claim 3 wherein said error covariance matrix is propagated in time as inertial data from said INS according to $P_{N+1} = \Phi P_N \Phi^T + Q$, where P is said error covariance matrix, $\Phi$ is a state transition matrix, and Q is a plant noise matrix.

5. A system according to claim 4 wherein:
    for a first position of said INS, point A, the state transition matrix, $\Phi$ is adjusted for one cycle of said filter to copy the current error state into at least one of said extra error states according to:

$\Phi$(POS_A_E, PX) = −sin(Wander_to_Grid)
    $\Phi$(POS_A_E, PY) = −cos(Wander_to_Grid)
    $\Phi$(POS_A_N, PX) = −cos(Wander_to_Grid)
    $\Phi$(POS_A_N, PY) = sin(Wander_to_Grid)
    $\Phi$(POS_A_A, PZ) = 1.0, and
    for a second position of said INS, point B, the state transition matrix, $\Phi$, is adjusted for one cycle of said filter to copy the current error state into at least one of said extra error states according to:

$\Phi$(POS_B_E, PX) = −sin(Wander_to_Grid)
    $\Phi$(POS_B_E, PY) = −cos(Wander_to_Grid)
    $\Phi$(POS_B_N, PX) = −cos(Wander_to_Grid)
    $\Phi$(POS_B_N, PY) = sin(Wander_to_Grid)
    $\Phi$(POS_B_A, PZ) = 1.0, where POS_A_E is a point A easting error state, POS_A_N is a point A northing error state, POS_A_A is a point A altitude error state, POS_B_E is a point B easting error state, POS_B_N is a point B northing error state, POS_B_A is a point B altitude error state, PX is a navigator wander frame X error state, PY is a navigator wander frame Y error state, PZ is a navigator wander frame Z error state, and Wander_to_Grid is a current azimuth angle between wander and grid frames.

6. A system according to claim 5 wherein upon a return of said INS to point A, said computer based system applies a measurement update to said filter, the measurement update including a difference between a current navigation position and the position recorded at a first visit of said INS to point A.

7. A system according to claim 6 wherein the difference results in observation matrix entries for the updating of point A position according to:

H (OBS_POS_A_E, PX) = sin (Wander_To_Grid),
H (OBS_POS_A_E, PY) = cos (Wander_To_Grid),
H (OBS_POS_A_N, PX) = cos (Wander_To_Grid),
H (OBS_POS_A_N, PY) = −sin (Wander_To_Grid),
H (OBS_POS_A_A, PZ) = −1.0,
H (OBS_POS_A_E, POS_A_E) = 1.0,
H (OBS_POS_A_N, POS_A_N) = 1.0, and
H (OBS_POS_A_A, POS_A_A) = 1.0, where OBS_POS_A_E is the observation of the difference in easting position, OBS_POS_A_N is the observation of the difference in northing position, and OBS_POS_A_A is the observation of the difference in vertical position.

8. A system according to claim 2 wherein said filter is programmed to compute gains for position updates according to $G = PH^T (HPH^T + R)^{-1}$, where R is the error covariance matrix for measurement updates and represents the error in exactly returning the vehicle to point A.

9. A system according to claim 2 wherein said computer based system is programmed to determine the positions of point A and a subsequent position, point B, according to:

$$PosA = \begin{bmatrix} PA\_E - \hat{X}(POS\_A\_E) \\ PA\_N - \hat{X}(POS\_A\_N) \\ PA\_A - \hat{X}(POS\_A\_A) \end{bmatrix}$$

$$PosB = \begin{bmatrix} PA\_E - \hat{X}(POS\_B\_E) \\ PA\_N - \hat{X}(POS\_B\_N) \\ PA\_A - \hat{X}(POS\_B\_A) \end{bmatrix}$$

where PA_E, PA_N, PA_A are the easting, northing, and altitude navigator position coordinates recorded at a first visit to point A, PB_E, PB_N, PB_A are the easting, northing, and altitude navigator position coordinates recorded at the visit to point B, POS_A_E is a point A easting error state, POS_A_N is a point A northing error state, POS_A_A is a point A altitude error state, POS_B_E is a point B easting error state, POS_B_N is a point B northing error state, POS_B_A is a point B altitude error state, and X is a filter state vector.

10. A system according to claim 1 wherein for at least one position of said INS, said computer based system is configured to utilize at least one position solution based on a survey of the position.

11. A data management system configured to receive inertial data from an inertial navigation system, said data management system comprising:
  at least one processor programmed to estimate position error states and position solutions for inertial navigation system (INS) positions; and
  a filter programmed to adjust estimates of the position error states based on correlations developed during a transition of the WS from a subsequent INS position back to a first INS position, wherein the filter processes inertial measurement data from the INS to produce real time estimates of position and velocity.

12. A data management system according to claim 11 wherein said filter comprises a Kalman filter augmented to contain a plurality of extra error states to represent position errors of at least two INS positions.

13. A data management system according to claim 12 wherein said filter comprises an error covariance matrix which contains information regarding an expected error in each state estimate and correlations between various error states associated with each INS position.

14. A data management system according to claim 11 wherein said at least one processor is programmed to determine the positions of point A and a subsequent position, point B, according to:

$$PosA = \begin{bmatrix} PA\_E - \hat{X}(POS\_A\_E) \\ PA\_N - \hat{X}(POS\_A\_N) \\ PA\_A - \hat{X}(POS\_A\_A) \end{bmatrix}$$

$$PosB = \begin{bmatrix} PA\_E - \hat{X}(POS\_B\_E) \\ PA\_N - \hat{X}(POS\_B\_N) \\ PA\_A - \hat{X}(POS\_B\_A) \end{bmatrix}$$

where PA_E, PA_N, PA_A are the easting, northing, and altitude navigator position coordinates recorded at a first visit to point A, PB_E, PB_N, PB_A are the easting, northing, and altitude navigator position coordinates recorded at the visit to point B, POS_A_E is a point A easting error state, POS_A_N is a point A northing error state, POS_A_A is a point A altitude error state, POS_B_E is a point B easting error state, POS_B_N is a point B northing error state, POS_B_A is a point B altitude error state, and X is a filter state vector.

* * * * *